(12) United States Patent
Purkayastha et al.

(10) Patent No.: US 12,279,635 B2
(45) Date of Patent: *Apr. 22, 2025

(54) GLUCOSYLATED STEVIOL GLYCOSIDE AS A FLAVOR

(71) Applicant: PURECIRCLE SDN BHD, Negeri Sembilan (MY)

(72) Inventors: Siddhartha Purkayastha, Chicago, IL (US); Avetik Markosyan, Negeri Sembilan (MY)

(73) Assignee: PureCirlce Sdn. Bhd., Negeri Sembilan (MY)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,113

(22) Filed: Jun. 15, 2023

(65) Prior Publication Data

US 2023/0320394 A1 Oct. 12, 2023

Related U.S. Application Data

(60) Continuation of application No. 16/835,103, filed on Mar. 30, 2020, now Pat. No. 11,690,391, which is a continuation of application No. 16/553,975, filed on Aug. 28, 2019, now Pat. No. 10,602,762, which is a continuation of application No. 15/437,208, filed on Feb. 20, 2017, now Pat. No. 10,398,160, which is a division of application No. 14/742,457, filed on Jun. 17, 2015, now Pat. No. 9,585,420, which is a division (Continued)

(51) Int. Cl.
*A23L 27/30* (2016.01)
*A23L 2/60* (2006.01)
*A23L 27/00* (2016.01)

(52) U.S. Cl.
CPC ............... *A23L 27/33* (2016.08); *A23L 2/60* (2013.01); *A23L 27/36* (2016.08); *A23L 27/88* (2016.08); *A23V 2002/00* (2013.01); *A23V 2200/16* (2013.01); *A23V 2250/258* (2013.01); *A23V 2250/5114* (2013.01)

(58) Field of Classification Search
CPC .................................................. C12N 9/1051
See application file for complete search history.

(56) References Cited

U.S. PATENT DOCUMENTS 2,500,173 A   3/1950   Gisvold
2,615,015 A   10/1952  Wilson
(Continued)

FOREIGN PATENT DOCUMENTS

CN   1049666   3/1991
CN   1100727   3/1995
(Continued)

OTHER PUBLICATIONS

Kennelly, "Sweet and non-sweet constituents of Stevia rebaudiana", Stevia: The genus Stevia, Taylor & Francis, 2002, 68-85.

(Continued)

*Primary Examiner* — Rosanne Kosson

(57) ABSTRACT

A taste and flavor profile modifying composition is described. The composition includes a blend of glucosylated steviol glycosides and residual steviol glycosides which can modify the intensity of a taste and/or flavor in a food or beverage product.

4 Claims, 5 Drawing Sheets

Related U.S. Application Data of application No. 14/031,290, filed on Sep. 19, 2013, now Pat. No. 9,107,436, which is a continuation-in-part of application No. 14/005,850, filed on Sep. 18, 2013, now abandoned, and a continuation-in-part of application No. 14/005,852, filed as application No. PCT/US2012/030210 on Mar. 22, 2012, now abandoned, which is a continuation-in-part of application No. PCT/US2011/033912, filed on Apr. 26, 2011, said application No. 14/005,852 is a continuation-in-part of application No. 13/841,261, filed on Mar. 15, 2013, now abandoned, and a continuation-in-part of application No. 13/589,754, filed on Aug. 20, 2012, now Pat. No. 8,735,101, and a continuation-in-part of application No. 13/567,707, filed on Aug. 20, 2012, now Pat. No. 8,647,844, said application No. 13/589,754 is a continuation of application No. 13/074,179, filed on Mar. 29, 2011, now Pat. No. 8,318,459, said application No. 13/567,707 is a division of application No. 13/029,263, filed on Feb. 17, 2011, now Pat. No. 8,257,948.

(60) Provisional application No. 61/725,233, filed on Nov. 12, 2012.

(56) References Cited

U.S. PATENT DOCUMENTS

| | | | |
|---|---|---|---|
| 3,723,410 | A | 3/1973 | Persinos |
| 4,082,858 | A | 4/1978 | Morita et al. |
| 4,112,218 | A | 9/1978 | Inoue et al. |
| 4,171,430 | A | 10/1979 | Ikushige et al. |
| 4,219,571 | A | 8/1980 | Miyake |
| 4,361,697 | A | 11/1982 | Dobberstein et al. |
| 4,454,290 | A | 6/1984 | Dubois |
| 4,590,160 | A | 5/1986 | Nishihashi et al. |
| 4,599,403 | A | 7/1986 | Kumar |
| 4,612,942 | A | 9/1986 | Dobberstein et al. |
| 4,657,638 | A | 4/1987 | Le Grand et al. |
| 4,892,938 | A | 1/1990 | Giovanetto |
| 4,915,969 | A | 4/1990 | Beyts |
| 4,917,916 | A | 4/1990 | Hirao et al. |
| 5,112,610 | A | 5/1992 | Kienle |
| 5,576,042 | A | 11/1996 | Fuisz |
| 5,779,805 | A | 7/1998 | Morano |
| 5,830,523 | A | 11/1998 | Takaichi et al. |
| 5,962,678 | A | 10/1999 | Payzant et al. |
| 5,972,120 | A | 10/1999 | Kutowy et al. |
| 6,031,157 | A | 2/2000 | Morita et al. |
| 6,080,561 | A | 6/2000 | Morita et al. |
| 6,204,377 | B1 | 3/2001 | Nishimoto et al. |
| 6,228,996 | B1 | 5/2001 | Zhou et al. |
| 6,318,157 | B1 | 11/2001 | Corso et al. |
| 6,706,304 | B1 | 3/2004 | Ishida et al. |
| 7,807,206 | B2 | 10/2010 | Magomet et al. |
| 7,838,044 | B2 | 11/2010 | Abelyan et al. |
| 7,862,845 | B2 | 1/2011 | Magomet et al. |
| 8,030,481 | B2 | 10/2011 | Prakash et al. |
| 8,257,948 | B1 | 9/2012 | Markosyan |
| 8,318,459 | B2 | 11/2012 | Markosyan |
| 8,647,844 | B2 | 2/2014 | Markosyan |
| 8,669,077 | B2 | 3/2014 | Markosyan |
| 8,735,101 | B2 | 5/2014 | Markosyan |
| 8,911,971 | B2 | 12/2014 | Markosyan |
| 8,993,269 | B2 | 3/2015 | Markosyan |
| 9,055,761 | B2 | 6/2015 | Markosyan |
| 9,107,436 | B2 | 8/2015 | Purkayastha et al. |
| 9,585,420 | B2 | 3/2017 | Purkayastha et al. |
| 2002/0132320 | A1 | 9/2002 | Wang et al. |
| 2002/0187232 | A1 | 12/2002 | Lee et al. |
| 2002/0197371 | A1 | 12/2002 | Lee et al. |
| 2003/0161876 | A1 | 8/2003 | Hansson et al. |
| 2003/0232118 | A1 | 12/2003 | Lerchenfeld et al. |
| 2003/0236399 | A1 | 12/2003 | Zheng et al. |
| 2006/0083838 | A1 | 4/2006 | Jackson et al. |
| 2006/0134292 | A1 | 6/2006 | Abelyan et al. |
| 2006/0142555 | A1 | 6/2006 | Jonnala et al. |
| 2007/0082102 | A1 | 4/2007 | Magomet et al. |
| 2007/0082103 | A1 | 4/2007 | Magomet et al. |
| 2007/0082106 | A1 | 4/2007 | Lee et al. |
| 2007/0116800 | A1 | 5/2007 | Prakash et al. |
| 2007/0116819 | A1 | 5/2007 | Prakash et al. |
| 2007/0116820 | A1 | 5/2007 | Prakash et al. |
| 2007/0116821 | A1 | 5/2007 | Prakash et al. |
| 2007/0116822 | A1 | 5/2007 | Prakash et al. |
| 2007/0116823 | A1* | 5/2007 | Prakash .............. A23L 27/36 426/548 |
| 2007/0116824 | A1 | 5/2007 | Prakash et al. |
| 2007/0116825 | A1 | 5/2007 | Prakash et al. |
| 2007/0116826 | A1 | 5/2007 | Prakash et al. |
| 2007/0116827 | A1 | 5/2007 | Prakash et al. |
| 2007/0116828 | A1 | 5/2007 | Prakash |
| 2007/0116829 | A1 | 5/2007 | Prakash et al. |
| 2007/0116830 | A1 | 5/2007 | Prakash et al. |
| 2007/0116831 | A1 | 5/2007 | Prakash et al. |
| 2007/0116832 | A1 | 5/2007 | Prakash et al. |
| 2007/0116833 | A1 | 5/2007 | Prakash et al. |
| 2007/0116834 | A1 | 5/2007 | Prakash et al. |
| 2007/0116835 | A1 | 5/2007 | Prakash et al. |
| 2007/0116836 | A1 | 5/2007 | Prakash et al. |
| 2007/0116837 | A1 | 5/2007 | Prakash et al. |
| 2007/0116838 | A1 | 5/2007 | Prakash et al. |
| 2007/0116839 | A1 | 5/2007 | Prakash et al. |
| 2007/0116840 | A1 | 5/2007 | Prakash et al. |
| 2007/0116841 | A1 | 5/2007 | Prakash et al. |
| 2007/0128311 | A1 | 6/2007 | Prakash et al. |
| 2007/0134390 | A1 | 6/2007 | Prakash et al. |
| 2007/0134391 | A1 | 6/2007 | Prakash et al. |
| 2007/0224321 | A1 | 9/2007 | Prakash et al. |
| 2007/0292582 | A1 | 12/2007 | Prakash et al. |
| 2008/0064063 | A1 | 3/2008 | Brandle et al. |
| 2008/0102497 | A1 | 5/2008 | Wong et al. |
| 2008/0107775 | A1 | 5/2008 | Prakash et al. |
| 2008/0107776 | A1 | 5/2008 | Prakash et al. |
| 2008/0107787 | A1 | 5/2008 | Prakash et al. |
| 2008/0108710 | A1 | 5/2008 | Prakash et al. |
| 2008/0111269 | A1 | 5/2008 | Politi et al. |
| 2008/0226770 | A1 | 9/2008 | Lee et al. |
| 2008/0226797 | A1 | 9/2008 | Lee et al. |
| 2008/0292764 | A1 | 11/2008 | Prakash et al. |
| 2008/0292765 | A1 | 11/2008 | Prakash et al. |
| 2008/0292775 | A1 | 11/2008 | Prakash et al. |
| 2008/0300402 | A1 | 12/2008 | Yang et al. |
| 2009/0017185 | A1 | 1/2009 | Catani |
| 2009/0053378 | A1 | 2/2009 | Prakash et al. |
| 2009/0074935 | A1 | 3/2009 | Lee |
| 2009/0079935 | A1 | 3/2009 | Harris et al. |
| 2009/0104330 | A1 | 4/2009 | Zasypkin |
| 2009/0142817 | A1 | 6/2009 | Norman et al. |
| 2009/0162499 | A1 | 6/2009 | McArdle et al. |
| 2009/0226590 | A1 | 9/2009 | Fouache et al. |
| 2009/0324793 | A1 | 12/2009 | Zheng et al. |
| 2010/0055752 | A1 | 3/2010 | Kumar |
| 2010/0056472 | A1 | 3/2010 | Duan et al. |
| 2010/0099857 | A1 | 4/2010 | Evans et al. |
| 2010/0057024 | A1 | 5/2010 | Cavallini |
| 2010/0112175 | A1 | 5/2010 | Abelyan et al. |
| 2010/0120710 | A1 | 5/2010 | Watanabe et al. |
| 2010/0137569 | A1 | 6/2010 | Prakash et al. |
| 2010/0018986 | A1 | 7/2010 | Abelyan et al. |
| 2010/0166679 | A1 | 7/2010 | Abelyan et al. |
| 2010/0189861 | A1 | 7/2010 | Abelyan et al. |
| 2010/0227034 | A1 | 9/2010 | Purkayastha et al. |
| 2010/0255171 | A1 | 10/2010 | Purkayastha et al. |
| 2010/0278993 | A1 | 11/2010 | Prakash et al. |
| 2010/0316782 | A1 | 12/2010 | Shi et al. |
| 2011/0030457 | A1 | 2/2011 | Valery et al. |
| 2011/0033525 | A1 | 2/2011 | Liu |
| 2011/0092684 | A1 | 4/2011 | Abelyan et al. |
| 2011/0104353 | A1 | 5/2011 | Lee |
| 2011/0111115 | A1 | 5/2011 | Shi et al. |
| 2011/0124587 | A1 | 5/2011 | Jackson et al. |

(56) References Cited

U.S. PATENT DOCUMENTS

| | | |
|---|---|---|
| 2011/0163011 A1 | 6/2011 | Prakash |
| 2011/0183056 A1 | 7/2011 | Morita et al. |
| 2011/0189360 A1 | 8/2011 | Yoo et al. |
| 2011/0195169 A1 | 8/2011 | Markosyan et al. |
| 2011/0224168 A1 | 9/2011 | Szente |
| 2012/0157553 A1 | 6/2012 | Dewis et al. |
| 2012/0164678 A1 | 6/2012 | Stephanopoulos et al. |
| 2012/0214751 A1 | 8/2012 | Markosyan |
| 2012/0214752 A1 | 8/2012 | Markosyan |
| 2012/0301589 A1 | 11/2012 | Markosyan |
| 2013/0030060 A1 | 1/2013 | Markosyan |
| 2013/0064955 A1 | 3/2013 | Miguel et al. |
| 2013/0347140 A1 | 12/2013 | Wang |
| 2014/0017378 A1 | 1/2014 | Purkayastha et al. |
| 2014/0271996 A1 | 9/2014 | Prakash et al. |
| 2014/0357588 A1 | 12/2014 | Markosyan et al. |
| 2015/0031868 A1 | 1/2015 | Lehmann et al. |
| 2015/0157045 A1 | 6/2015 | Markosyan |
| 2017/0190728 A1 | 7/2017 | Markosyan |
| 2018/0079767 A1 | 3/2018 | Markosyan et al. |

FOREIGN PATENT DOCUMENTS

| | | |
|---|---|---|
| CN | 1112565 | 11/1995 |
| CN | 1192447 | 9/1998 |
| CN | 1238341 | 5/2002 |
| CN | 1349997 | 5/2002 |
| CN | 101200480 | 6/2008 |
| CN | 101591365 | 12/2009 |
| CN | 101628924 | 1/2010 |
| EP | 0957178 | 4/1999 |
| EP | 2433505 | 3/2012 |
| EP | 2510800 | 10/2012 |
| GB | 2027423 | 2/1980 |
| JP | 52005800 | 1/1977 |
| JP | 52083731 | 7/1977 |
| JP | 52100500 | 8/1977 |
| JP | 52136200 | 11/1977 |
| JP | 54030199 | 3/1979 |
| JP | 54132599 | 10/1979 |
| JP | 55039731 | 3/1980 |
| JP | 55081567 | 6/1980 |
| JP | 55092400 | 7/1980 |
| JP | 55120770 | 9/1980 |
| JP | 55138372 | 10/1980 |
| JP | 55159770 | 12/1980 |
| JP | 55162953 | 12/1980 |
| JP | 56099768 | 8/1981 |
| JP | 56109568 | 8/1981 |
| JP | 56121453 | 9/1981 |
| JP | 56121454 | 9/1981 |
| JP | 56121455 | 9/1981 |
| JP | 56160962 | 12/1981 |
| JP | 57002656 | 1/1982 |
| JP | 57005663 | 1/1982 |
| JP | 57046998 | 3/1982 |
| JP | 57075992 | 5/1982 |
| JP | 57086264 | 5/1982 |
| JP | 58020170 | 2/1983 |
| JP | 58028246 | 2/1983 |
| JP | 58028247 | 2/1983 |
| JP | S5878562 | 5/1983 |
| JP | 58212759 | 12/1983 |
| JP | 58212760 | 12/1983 |
| JP | 59045848 | 3/1984 |
| JP | S5948059 | 3/1984 |
| JP | 59183670 | 10/1984 |
| JP | S6037950 | 2/1985 |
| JP | 60188035 | 9/1985 |
| JP | 62166861 | 7/1987 |
| JP | 63173531 | 7/1988 |
| JP | 1131191 | 5/1989 |
| JP | H0383558 | 4/1991 |
| JP | 3262458 | 11/1991 |
| JP | 6007108 | 1/1994 |
| JP | H4-322220 | 5/1994 |
| JP | 6192283 | 7/1994 |
| JP | 7143860 | 6/1995 |
| JP | 7177862 | 7/1995 |
| JP | 8000214 | 1/1996 |
| JP | 9107913 | 4/1997 |
| JP | 2000236842 | 9/2000 |
| JP | 2000270804 | 10/2000 |
| JP | 2002045145 | 2/2002 |
| JP | 2002262822 | 9/2002 |
| JP | 2010516764 | 5/2010 |
| KR | 20070067199 | 6/2007 |
| KR | 20080071605 | 8/2008 |
| KR | 10088869 | 3/2009 |
| KR | 20090021386 | 3/2009 |
| RU | 2111969 | 5/1998 |
| RU | 2123267 | 12/1998 |
| RU | 2156083 | 9/2000 |
| RU | 2167544 | 5/2001 |
| RU | 2198548 | 2/2003 |
| WO | 2002087359 | 11/2002 |
| WO | 2005089483 | 9/2005 |
| WO | 2006072878 | 7/2006 |
| WO | 2006072879 | 7/2006 |
| WO | 2007061795 | 5/2007 |
| WO | 2008091547 | 7/2008 |
| WO | 2008112966 | 9/2008 |
| WO | 2009071277 | 6/2009 |
| WO | 2009108680 | 9/2009 |
| WO | 2009140394 | 11/2009 |
| WO | 2010038911 | 4/2010 |
| WO | 2010118218 | 10/2010 |
| WO | 2010146463 | 12/2010 |
| WO | 2011046423 | 4/2011 |
| WO | 2011059954 | 5/2011 |
| WO | 2011097359 | 8/2011 |
| WO | 2011112892 | 9/2011 |
| WO | 2011153378 | 12/2011 |
| WO | 2012006728 | 1/2012 |
| WO | 2012082493 | 6/2012 |
| WO | 2012082677 | 6/2012 |
| WO | 2012088593 | 7/2012 |
| WO | WO-2012088593 A1 * | 7/2012 ......... A23L 1/22091 |
| WO | 2012102769 | 8/2012 |
| WO | 2012112180 | 8/2012 |
| WO | 2012125991 | 9/2012 |
| WO | 2012129451 | 9/2012 |
| WO | 2012166163 | 12/2012 |
| WO | 2012166164 | 12/2012 |
| WO | 2012177727 | 12/2012 |
| WO | 2013022989 | 2/2013 |
| WO | 2014122328 | 2/2013 |
| WO | 2013096420 | 6/2013 |
| WO | 2013110673 | 8/2013 |
| WO | 2013176738 | 11/2013 |
| WO | 2014122227 | 8/2014 |
| WO | 2014146089 | 9/2014 |
| WO | 2014146135 | 9/2014 |
| WO | 2014193888 | 12/2014 |
| WO | 2016023103 | 2/2016 |
| WO | 2016187559 | 11/2016 |
| WO | 2017160846 | 9/2017 |

OTHER PUBLICATIONS

Kinghorn, "Overview", Stevia: The genus Stevia, Taylor & Francis, 2002, 1-17.

Kitahata, S et al., "Production of Rubusoside Derivatives by Transgalactosylation of Various b-Galactosidases" Agric. Biol. Chem., vol. 53, No. 11 1989, 2923-2928.

Kobayashi, et al., "Dulcoside A and B, New diterpene glycosides from Stevia Rebaudiana", Phytochemistry, vol. 16 1977, 1405-1408.

Kochikyan, et al., "Combined Enzymatic Modification of Stevioside and Rebaudioside A", Applied Biochemistry and Microbiology, vol. 42, No., 1, 2006, 31-37.

Kohda, et al., "New sweet diterpene glucosides from Stevia Rebaudiana", Phytochemistry, vol. 15 1976, 981-983.

(56) References Cited

OTHER PUBLICATIONS

Kovylyaeva, et al., "Glycosides from Stevia rebaudiana", Chemistry of Natural Compounds, vol. 43, No. 1 2007, 81-85.
Li, Sha et al.; "Transglycosylation of stevioside to improve the edulcorant quality by lower substitution using cornstarch hydrolysate and CGTase", Food Chemistry, vol. 138, No. 2, Nov. 12, 2012, pp. 2064-2069, XP028977479, ISSN: 0308-8146, DOI: 10.1016/J.FOODCHEM.2012.10.124.
Liu, et al., "Study of stevioside preparation by membrane separation process", Desalination, vol. 83 1991, 375-382.
Lobov, S. V. et al., "Enzymic Production of Sweet Stevioside Derivatives: Transglucosylation of Glucosidases", Agric. Biol. Chem., vol. 55, No. 12 1991, 2959-2965.
Markovic et al., "Chemical composition of leaf extracts of Stevia rebaudiana Bergoni grown experimentally in Vogvodina", J. Serb. Chem. Soc. 73 (3) 283-297 (2008).
Montovaneli, et al., "The effect of temperature and flow rate on the clarification of the aqueous Stevia-extract in fixed-bed col. with zeolites", Brazilian Journal of Chemical Engineering, vol. 21, No. 3 2004, 449-458.
Moraes, et al., "Clarification of Stevia rebaudiana (Bert.) Bertoni extract adsorption in modified zeolites", Acta Scientiarum, vol. 23, No. 6 2001, 1375-1380.
News Bites, GLG announces high purity REB M GRAS notification with FDA. Consumer Durables & Apparel Melbourne. Apr. 15, 2014. pp. 1-2. especially, p. 1, para 5; p. 2, para 1.
Ohio "14.0 Spray Drying and Spray Dryers", pp. 1-10, http://elassist.ohio-state-edu/DairyTech/14Spraydrying.htm Nov. 2, 2009 as obtained by internetarchive.org.
Ohta et al., "Characterization of Novel Steviol Glycosides from Leaves of Stevia rebaudiana Morita," J. Appl. Glycosi., vol. 57, 199-209, 2010.
Ohtani et al. "Chapter 7. Methods to improve the taste of the sweet principles of Stevia rebaudiana." The Genus Stevia, edited by A. Douglas Kinghorn, CRC Press 2001, Taylor and Francis, London and New York, pp. 138-159.
Philips, K.C. "Stevia: steps in developing a new sweetener", In T.H. Grenby, Editor, Developments in Sweeteners-3, Elsevier 1987, 1-43.
Pol, et al., "Characterisation of Stevia Rebaudiana by comprehensive two-dimensional liquid chromatography time-of- flight mass spectrometry," Journal of Chromatography A, 1150 (2007) 85-92.
Pol, et al., "Comparison of two different solvents employed for pressurised fluid extraction of stevioside from Stevia rebaudiana: methanol versus water", Anal Bioanal Chem vol. 388 2007, 1847-1857.
Prakash et al. "Isolation and Characterization of a Novel Rebaudioside M Isomer from a Bioconversion Reaction of Rebaudioside A and NMR Comparison Studies of Rebaudioside M Isolated from Stevia rebaudiana Bertoni and Stevia rebaudiana Morita," Biomolecules, vol. 4, 2014, 374-389, p. 385 para 5.
Prakash et al., "Development of Next Generation Stevia Sweetener: Rebaudioside M" Foods 2014, 3, 162-175, ISSN 2304-8158.
Prakash et al., "Development of rebiana, a natural, non-caloric sweetener," Jul. 1, 2008, Food and Chemical Toxicology, vol. 46, Is. 7, Sup. 1, p. S75-S82.
Rajbhandari et al., "The Flavonoids of Stevia Rebaudiana", Department of Pharmacognosy, Mar.-Apr. 1983, pp. 194-195.
Ramirez, I.; "Glucose polymer taste is not unitary for rats", Physiology & Behaviour, 1994, 55(2), pp. 355-360 (Abstract only).
Rebaudioside A and Stevia Extract, Internet Citation, 2007 fittp://emperorsherbotogist.cornirebaudioside_a:php. p. 1-3.
Remington: The Science and Practice of Pharmacy, 21st Edition. The University of the Sciences in Philadelphia, 2006. Part 5, p. 700.
Richman et al., "Fuctional genomics uncovers three glucosyltransferases involved in the synthesis of the major sweet glucosides of Stevia rebaudiana," The Plant Journal, vol. 41 (2005) 56-67.
Sakamoto et al., "Application of 13C NMR Spectroscopy to Chemistry of Natural Glycosides: Rebaudioside-C, a New Sweet Diterpene Glycoside of Stevia Rebaudiana", Chem. Pharm. Bull., vol. 25, 1977, 844-846.
Shi, et al. "Synthesis of bifuntional polymeric adsorbent and its application in purification of Stevia glycosides", Reactive & functional Polymers, vol. 50 2002, 107-116.
Shibata et al. "Glucosylation of Steviol and Steviol-Glucosides in Extracts from Stevia rebaudiana Bertoni," Plant Physiol. Vol. 95, (1991) 152-156.
Starratt, et al. "Rebaudioside F, a diterpene glycoside from Stevia Rebaudiana", Phytochemistry, vol. 59 2002, 367-370.
Sweet Green Fields, LLC "Notice to the U.S. Food and Drug Administration (FDA) that the use of Rebiana (Rebaudiosid A) derived from Stevia rebaudiana, as a Food Ingredient is Generally Recognized as Safe (GRAS)," Jan. 15, 2009, http:/www.accessdata.fda.goviscripts/fcn/gras_notices/grn000282.pdf (obtained from the Web on May 8, 2012) entire document esp. p. 22, Table 1.
Tanaka, 0., "Improvement of taste of natural sweeteners," Pure & Appl. Chem., vol. 69, No. 4 1997, 675-683.
Teo, et al. "Validation of green-solvent extraction combined with Chromatographic chemical fingerprint to evaluate quality of Stevia reaudiana Bertoni", J. Sep. Sci, vol. 32 2009, 613-622.
Toyo sugar, "GRAS Exemption Claim for a-Glucosylated Steviol Glycosides" Office of Food Additive Safety. Feb. 23, 2011.
Un "Steviol Glycosides" JECFA 2008 pp. 1-4, UN "Steviol Glycosides" JECFA 2008 pp. 1-4 http://www.fao,org/agiaa,n/lecfa-additives/specs/monograph5/additive-442-m5.pdf.
United Nations' Food and Agriculture Organization/Joint Expert Committee on Food Additives (2010) Steviol Glycosides, Compendium of Food Additive Specifications, FAO JECFA Monographs 10, 17-21.
van der Maarel et al., "Properties and applications of starch-converting enzymes of the a-amylase family," Journal of Biotechnology, vol. 94 (220) 137-155.
Vasquez et al., Stimulation of the Gerbil's Gustatory Receptors by Some Potently Sweet Terpenoids, J. Agric. Food Chem., vol. 41, 1305-1310, 1993.
Wallin, "Steviol glycosides," 2004, XP002740430 ftp://11p.fao.orgfes/esnijecfa/cta/CTA63 Steviol.pdf, pp. 1, 4, 5. Retrieved 2015.
Yamamoto, K. et al., "Effective Production of Glycosyl-steviosides by a-1, 6 Transglucosylation of Dextrin Dextranase", Biosci, Biotech, Biochem. vol. 58, No. 9 1994, 1657-1661.
Ye, et al. "Modification of stevioside using transglucosylation activity of Bacilllus amyloliquefaciens a-amylase to reduce its bitter aftertaste," LWT—Food Science and Technology, vol. 51, Issue 1, May 2013, pp. 524-530.
Yoda, et al. "Supercritical fluid extraction from Stevia rebaudiana Bertoni using CO2 and CO2+ water: extraction kinetics and identification of extracted components", Journal of Food Entineerint, vol. 57 2003, 125-134.
Yoshikawa, et al. "Transglycosylation of Mogroside V, a Triterpene Glycoside in Siraitia grosvenori, by Cyclodextrin Glucanotransferase and Improvement of the Qualities of Sweetness," The Japanese Society of Applied Glycoscience, vol. 52, No. 3, 2005, 8.247-252.
Zell, et al. "Investigation of Polymorphism in Aspartame and Neotame Using Solid State NMR Spectroscopy", Tetrahedron, vol. 56, 2000, 6603-6616.
Zhang et al. "Membrane-based separation scheme for processing sweetener from Stevia leaves", Food Research International, vol. 33 2000, 617-620.
Koyama, E. et al., "In vitro metabolism of the glycosidic sweeteners, stevia mixture and enzymatically modified stevia in human intestinal microflora" Food and Chemical Toxicology (2003), 41, 359-374.
Mizutani, K., et al., "Study on Improvement of Sweetness of Steviol Bisglycosides Selective Enzymic Transglucosylation of the 13-0-Glycosyl Moiety" Agric. Biol. Chem., (1989), 52(2), 395-398.
"Acetone". Available online from Sigma-Aldrich as of Jan. 4, 2016. pp. 1-2.
"Methanol". Available online from Sigma-Aldrich as of Jan. 4, 2016. pp. 1-2.

(56) References Cited

OTHER PUBLICATIONS

"Recrystallization Technique: Proper purification of crystalline solids". Available online as of Dec. 4, 2009 from www.erowid.org. pp. 1-3.
"Toxicity, Alcohols". Available online as of Jan. 29, 2010 from emedicine.medscape.com. pp. 1-4.
a-Glucosyltransferase Treated Stevia, Japan's Specifications and Standards for Food Additives, VIII edition, 2009, p. 257.
Ahmed, et al., "Use of p-Bromophenacyl Bromide to Enhance Ultraviolet Detection of Water-Soluble Organic Acids (Steviolbioside and Rebaudioside B) in High-Performance Liquid Chromatographic Analysis", Journal of Chromatography, vol. 192, 1980, 387-393.
Bae S. et al.; "Manufacturing enzymatically modified Stevia for use in food and drink e.g. alcoholic beverage and for use as sweetening agent, flavor enhancer and reagent, involves adding cyclodextrin glucosyltransferase and Stevia extract in solvent", WPI/THOMSON, vol. 2009, No. 60, Mar. 16, 2009, XP002729278.
Chang, S. S. et al., "Stability Studies of Stevioside and Rebaudioside A in Carbonated Beverages", Journal of Agricultural and Food Chemistry, vol. 31, 1983, 409-412.
Chatsudthipong, et al. Stevioside and related compounds: Therapeutic benefits beyond sweetness, pp. 41-45 Pharmacology & Therapeutics 121 (2009).
Chaturvedula et al., "Structures of the novel diterpene glycosides from Stevia rebaudiana", Carbohydrate Research 346 (2011) pp. 1057-1060.
Chaturvedula et al., "Two Minor Diterpene Glycosides from the Leaves of Stevia rebaudiana", Natural Product Communications, 2011, vol. 6, No. 2, pp. 175-178.
Chen, et al., "Enrichment and separation of rebaudioside A from stevia glycosides by a novel adsorbent with pyridyl group", Science in China, vol. 42, No. 3 1999, 277-282.
Chen, et al., "Selectivity of polymer adsorbent in adsorptive separations of stevia diterpene glycisides", Science in China, vol. 41, No. 4 1998, 436-441.
Chen, et al., "Studies on the adsorptive selectivity of the polar resin with carbonyl group on rebaudioside A", Acta Polymeric Scnica, No. 4 1999, 398-403.
Crammer, et al., "Sweet glycosides from the Stevia plant", Chemistry in Britain, Oct. 1986, 915-916, 918.
Darise et al., "Enzymic Transglucosylation of Rubusoside and the Structure-Sweetness Relationship of Steviol Bisglycosides," Agric. Biol. Chem. vol. 48(10), 1984, 2483-2488.
Dubois et al., "Diterpenoid Sweeteners. Synthesis and Sensory Evaluation of Stevioside Analogues with improved Organoleptic Properties," J. Med. Chem. vol. 28, (1985) 93-98.
FAO/WHO "Combined Compendium of Food Additive Specifications" FAO JECFA Monographs 1, vol. 4, 2006, Food and Agricultural Organization of the United Nations, Rome.
Fuh, "Purification of steviosides by membrane and ion exchange process", Journal of Food Science, vol. 55, No., 5 1990, 1454-1457.
Fukunaga et al., "Enzymic Transglucosylation Products of Stevioside: Separation and Sweetness-evaluation," Agric. Biol, Chem. vol. 53(6) (1989) 1603-1607.
Fullas et al., "Separation of natural product sweetening agents using overpressured layer chromatography," Journal of Chromatography vol. 464 (1989) 213-219.
Gorden et al. ("Supersaturation" Access Science McGraw Hill 2008, p. 1, http://www.accessscience.com/content/supersaturation/670000).
Goyal et al., "Stevia (Stevia rebaudiana) a bio-sweetener: a review", International Journal of Food Sciences and Nutrition, Feb. 2010; 61(1): pp. 1-10.
Hale, et al., "Amylase of Bacillus Macerans", Cereal Chemistry, vol. 28, No., I, Jan. 1951, 49-58.
Harman et al. "Sensory Testing for Flavorings with Modifying Properties", ift.org, Number 2013, vol. 67, No. 11, 15 pages.
Hartel, Richard "Crystallization in Foods" Handbook of Industrial Crystallization Elsevier 2002, pp. 287 and 293-296.
Huang, X Y, et al. "Preparative isolation and purification of steviol glycosides from Stevia rebaudiana Bertoni using high-speed counter-current chromatography" Separation and Purification Technology Elsevier Science, Netherlands, vol. 71, No. 2, 2010, p. 220-224.
International Search Report and Written Opinion of PCT/US2010/055960.
International Search Report and Written Opinion of PCT/US2011/028028.
International Search Report and Written Opinion of PCT/US2011/033734.
International Search Report and Written Opinion of PCT/US2011/033737.
International Search Report and Written Opinion of PCT/US2011/033912.
International Search Report and Written Opinion of PCT/US2011/035173.
International Search Report and Written Opinion of PCT/US2011/036063.
International Search Report and Written Opinion of PCT/US2011/047498.
International Search Report and Written Opinion of PCT/US2011/047499.
International Search Report and Written Opinion of PCT/US2011/064343.
International Search Report and Written Opinion of PCT/US2012/024585.
International Search Report and Written Opinion of PCT/US2012/024722.
International Search Report and Written Opinion of PCT/US2012/030210.
International Search Report and Written Opinion of PCT/US2012/043294.
International Search Report and Written Opinion of PCT/US2012/051163.
International Search Report and Written Opinion of PCT/US2012/052659.
International Search Report and Written Opinion of PCT/US2012/052665.
International Search Report and Written Opinion of PCT/US2013/030439.
International Search Report and Written Opinion of PCT/US2014/041548.
International Search Report and Written Opinion of PCT/US2014056451.
International Search Report and Written Opinion of PCT/US2015/047234.
International Search Report and Written Opinion of PCT/US2018/053258.
Jaitak, et al., "An Efficient Microwave-assisted Extraction Process of Stevioside and Rebaudioside-A from Stevia Rebaudiana (Bertoni)", Phytochem. Anal, vol. 20 2009, 240-245.
R. Kasai, N. Kaneda, O. Tanaka, K. Yamasaki, I. Sakamoto, K. Morimoto, S. Okada, S. Kitahata, H. Furukawa, "Sweet Diterpene Glycoside of Stevia Leaves" Nippon Kagokukaishi (1981), (5), 726-735.

* cited by examiner

GLUCOSYLATED STEVIOL GLYCOSIDE AS A FLAVOR

RELATED APPLICATIONS

The present application is a continuation of, and claims the benefit of priority to U.S. patent application Ser. No. 16/835,103, filed on Mar. 30, 2020, which is a continuation of, and claims the benefit of priority to, U.S. patent application Ser. No. 16/553,975, filed on Aug. 28, 2019, which is a continuation of, and claims the benefit of priority to, U.S. patent application Ser. No. 15/437,208, filed on Feb. 20, 2017, which is a divisional of, and claims the benefit of priority to, U.S. patent application Ser. No. 14/742,457, filed on Jun. 17, 2015, which is a divisional of, and claims the benefit of priority to, U.S. patent application Ser. No. 14/031,290, filed on Sep. 19, 2013, the contents of which are incorporated by reference herein, which is a continuation-in-part application of, and claims the benefit of priority to, the following applications:

- U.S. patent application Ser. No. 14/005,852, filed on Sep. 18, 2013, which is a US National Stage Application under 35 U.S.C. § 371 of PCT Application number PCT/US2012/030210, filed on Mar. 22, 2012;
- U.S. patent application Ser. No. 14/005,850, filed on Sep. 18, 2013, which is a US National Stage Application under 37 U.S.C. § 371 of PCT Application number PCT/US2011/033912, filed on Apr. 26, 2011;
- U.S. patent application Ser. No. 13/567,707, filed on Aug. 6, 2012, which issued as U.S. Pat. No. 8,647,844 on Feb. 11, 2014, and which is a divisional application of and claims the benefit of priority to U.S. patent application Ser. No. 13/029,263, filed on Feb. 17, 2011, which issued as U.S. Pat. No. 8,257,948 on Sep. 4, 2012;
- U.S. patent application Ser. No. 13/589,754, filed on Aug. 20, 2012, which issued as U.S. Pat. No. 8,735,101 on May 27, 2014, and which is a continuation application of and claims the benefit of priority to U.S. patent application Ser. No. 13/074,179, filed on Mar. 29, 2011, which issued as U.S. Pat. No. 8,318,459 on Nov. 27, 2012;
- U.S. patent application Ser. No. 13/841,261, filed on Mar. 15, 2013; and U.S. Provisional Patent application No. 61/725,233, filed on Nov. 12, 2012.

BACKGROUND OF THE INVENTION

Field of the Invention

The present invention relates generally to glucosylated steviol glycoside compositions and methods for making and using them as a taste improver and flavor modifier in various food and beverage products. The invention also relates to a combination of selective combination of glucosylated steviol glycoside components and steviol glycoside molecules from Stevia rebaudiana Bertoni plant extract to make the optimum sweetness profile and flavor modification in food and beverage applications. The invention also relates to the combination of the steviol glycoside derived molecules and maltodextrin derived from starch to provide the mouthfeel and flavor modification characteristics of Glucosylated steviol Glycosides in reduced or no sugar added food and beverage products.

Description of the Related Art

The extract of Stevia rebaudiana plant contains a mixture of different sweet diterpene glycosides, which have a single base—steviol and differ by the presence of carbohydrate residues at positions C13 and C19. These glycosides accumulate in Stevia leaves and compose approximately 10%-20% of the total dry weight. Depending on the variety of Stevia plant, the major steviol glycoside molecules present in the stevia extract are stevioside, Rebaudioside A, Rebaudioside C, Dulcoside A, Rebaudioside D, Rebaudioside B and Rebaudioside F. Other minor components are Rebaudioside E, Steviolbioside and Rubusoside. Recent research found additional steviol glycoside molecules (Ohta et al, 2010; Prakash et al, 2013): Rebaudioside G, H, I, J, K, L, M, N, and O.

All steviol glycoside molecules have high intensity of sweetness, ranging between 50 to 400 times sweeter than sugar. However, apart from the high level of sweetness, they have also intrinsic properties of bitter and licorice taste and undesirable aftertaste. Some undesirable taste characteristics of glycosides can be as a result of contamination of other substances present in stevia extract.

One of the main ways to improve the taste quality is the enzymatic glycosylation of mixture of semi-purified steviol glycosides. It is known that the undesired taste attributes can be substantially reduced or eliminated by the reaction of intermolecular transglycosylation of various enzymes, upon which the attachment of new carbohydrates at positions C13 and C19 of steviol glycosides takes place (FIGS. 1A-B). With an increase in the number of glucose units in steviol glycoside molecules (for example, from stevioside to Rebaudioside A), the sweetness intensity increases and sweetness profile (taste) improves. However, the relative sweetness does not increase significantly beyond a certain level with a further increase of glucose units, as shown in FIG. 2. The published data show that the sweetness quality improves with the addition of glucose units, but does not explicitly or implicitly mention that the addition of glucose units contributes to a reduction of sweetness.

In this invention, a process is developed to make a mixture of glucosylated steviol glycosides with small amount of other steviol glycosides and maltodextrin. The process involved precise control of pH, temperature, enzyme source and activity, quality of stevia extract, glucose-donor (amount and source) and time to achieve blends of different ratios of glucosylated steviol glycosides, steviol glycoside molecules, and maltodextrin.

SUMMARY OF THE INVENTION

The present invention is directed to a taste and flavor profile improving composition. The composition includes glucosylated steviol glycosides, steviol glycosides and maltodextrin. In some embodiments, the glucosylated steviol glycosides may include a plurality of glucose units. For example, the glucosylated steviol glycosides may include three, four, five, or more than five glucose units (FIGS. 1A-B).

The invention, in part, pertains to an ingredient containing glucosylated steviol glycoside (GSG) of different degree of glycosylation to steviol glycoside molecules derived from stevia extract of Stevia Rebaudiana Bertoni plant. Also, this invention, in part, pertains to specific blends of GSG components with varying degree of glycosylation.

The invention, in part, pertains to an ingredient comprising steviol glycosides of Stevia Rebaudiana Bertoni plant. The steviol glycosides are selected from the group consisting of stevioside, Rebaudioside A, Rebaudioside B, Rebaudioside C, Rebaudioside D, Rebaudioside E, Rebaudioside F, dulcoside A, steviolbioside, rubusoside, as well as other steviol glycosides found in *Stevia Rebaudiana* Bertoni plant and mixtures thereof. Rebaudioside is commonly expressed as Reb or reb also.

The invention, in part, pertains to specific blends of different steviol glycosides (SG) and glucosylated steviol glycosides (GSG) for producing an ingredient containing Rebaudioside D, Rebaudioside A, Rebaudioside B, stevioside, Rebaudioside C, and other steviol glycosides found in *Stevia Rebaudiana* Bertoni plant and mixtures thereof.

The invention, in part, pertains to specific blends of different GSG, SG components and residual maltodextrins derived from starch, which is used as glucose-donor. The source of starch, such as, but not limited to, tapioca, maize, wheat, potato, barley, sweet potato and other commercial and non-commercial carbohydrate source.

The present invention is also directed to a process to make the different blends of GSG and SG from *stevia* extracts of different amount and mixture of steviol glycosides. The process conditions, type and ratio of *stevia* extract and starch used are crucial for making the composition, which will yield different amount and composition of GSG, SG and maltodextrin.

The invention, in part, pertains to a process of manufacturing the specific blend of GSG components, selected steviol glycosides (SG) and maltodextrin. The processing steps include:
  i) Tapioca starch is dissolved in RO water and liquefied by CGTase under controlled processing conditions
  ii) The *stevia* extract with total steviol glycosides content between 75% and 99% is added to liquefied starch.
  iii) The starch to *stevia* extract ratio was optimized between 35:65 and 65:35
  iv) CGTase enzyme added to mixture and incubated at 60° C. for a desired length of reaction time to glycosylate steviol glycosides with glucose molecules derived from Tapioca starch.
  v) After desired ratio of GSG and residual steviol glycoside contents achieved, the reaction mixture is heated to 100° C. for 15 min to inactivate the CGTase, which is then removed by treating with activated carbon.
  vi) The resulting solution of GSG, residual steviol glycosides and maltodextrin is concentrated by means of conventional vacuum evaporator and dried.

The present invention is also directed to a food or beverage product having an intense taste and flavor profile, wherein the food or beverage product includes a taste and flavor modifying composition comprising glucosylated steviol glycosides, selected steviol glycosides and maltodextrins. A wide range of food and beverage products, such as, but not limited to, carbonated soft drinks, fruit juices, dairy foods, dairy beverages, baked goods, cereal products, and table top sweeteners, may be made in accordance with the present invention. The taste and flavor profile of a food or beverage product including a taste and flavor modifying composition, wherein the taste and flavor modifying composition includes the blend of glucosylated steviol glycosides, steviol glycosides and maltodextrin, may be more intense than a comparative taste and flavor profile of a comparative food or beverage product which does not include the taste and flavor modifying composition. Moreover, the mouthfeel of a food or beverage product including the taste and flavor modifying composition, wherein the taste and flavor modifying composition includes glucosylated steviol glycosides, selected steviol glycosides and maltodextrins, may be improved in relation to a mouthfeel of a comparative food or beverage product which does not include the taste and flavor modifying composition.

The present invention is further directed to a method of enhancing the taste and flavor intensity of a food or beverage product, including the step of adding a taste and flavor modifying composition to the food or beverage product, wherein the taste and flavor modifying composition includes the blend of glucosylated steviol glycosides, selected steviol glycosides and maltodextrins.

The foregoing has outlined rather broadly the features and technical advantages of the present invention in order that the detailed description of the invention that follows may be better understood. Additional features of the invention which form the subject of the claims of the invention will be described hereinafter. It should be appreciated by those skilled in the art that the specific embodiments disclosed may be readily utilized as a basis for modifying or designing other methods or structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description. It is to be understood that both the foregoing general description and the following detailed description are exemplary and explanatory and are intended to provide further explanation of the invention as claimed.

The compositions can be used as flavor modifier in various food and beverage products. Non-limiting examples of beverage products include carbonated and still beverages, flavored water, juice-based beverages, energy drinks and powder soft drinks. Non-limiting examples of food include dairy products (yogurt, yogurt drinks, flavored milk, frozen dairy desserts including ice cream), baked goods and baking mixes (bread, biscuits, cookies, muffins, rolls, and baking mixes), sauces and gravies, jams and jellies, gelatins, puddings and fillings, soy sauce and other soy based products, breakfast cereals, condiments and relishes, confections and frostings, processed fruits and vegetables, sugar substitutes and confectionery products including chewing gums.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

FIG. 1A shows the single glycosylation of stevioside. FIG. 1B shows multiple glycosylation.

DETAILED DESCRIPTION OF THE INVENTION

Figure 1A:
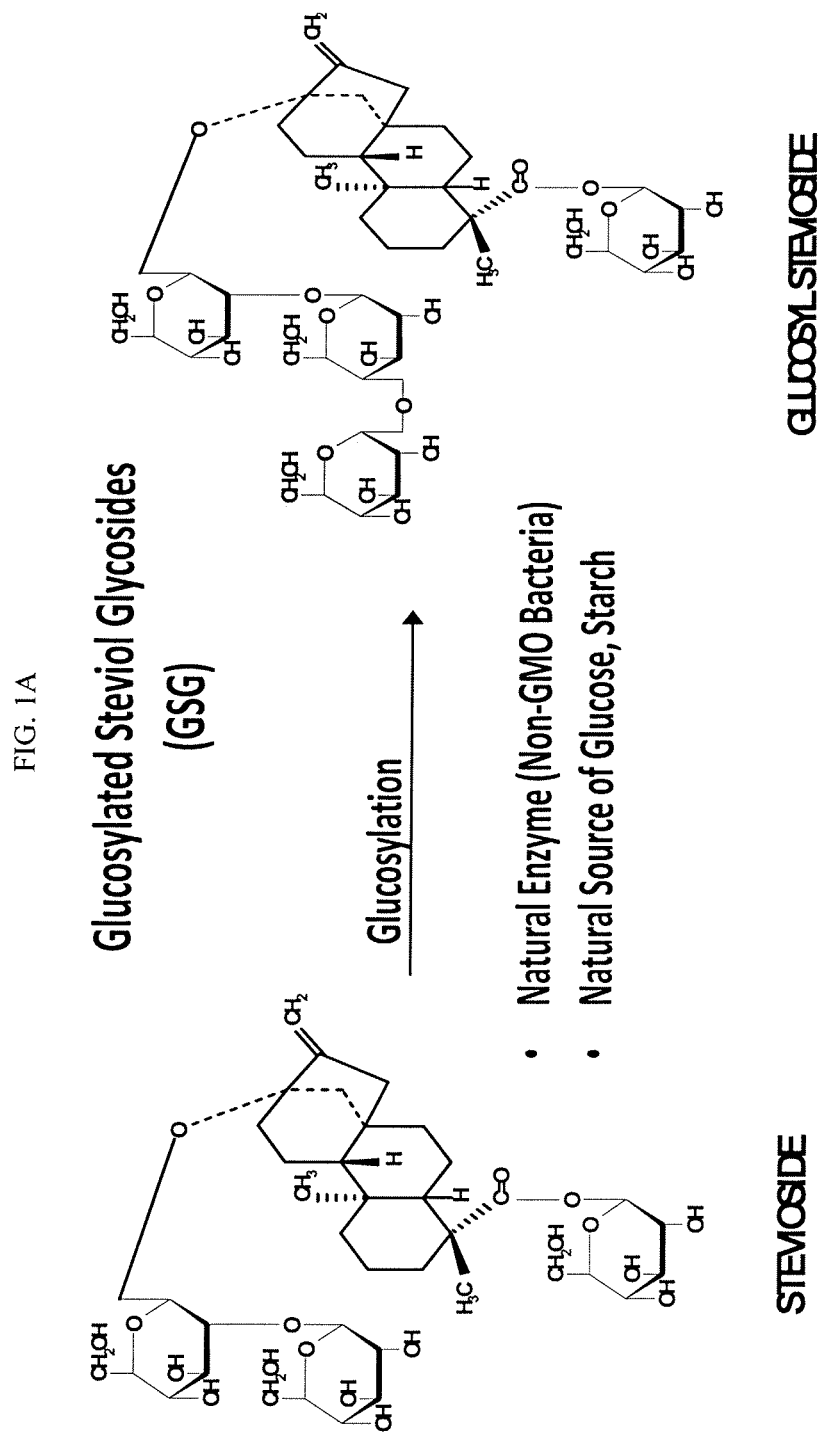
FIGS. 1A-B illustrates the glycosylation steps for making different glucosylated steviol glycoside molecules from stevioside.

It has been unexpectedly discovered that glycosylation of steviol glycosides beyond a certain number of glucose units effectively reduces sweetness. It has also been discovered that with the reduction of sweetness, the glucosylated steviol glycosides (hereinafter "GSG") can contribute to the modification of flavor and sweetness profiles in a wide range of food and beverage applications.

It has also been discovered that the modification of flavor and sweetness profile is affected by the composition of the blend of GSG, steviol glycosides (SG) and maltodextrin. The size and amount of GSG molecules and the type and amount of residual steviol glycoside (SG) contribute different degree of flavor modification. Therefore, while sweetness decreases with glycosylation, flavor modification increases. The flavor modification may include an increase (enhance) in certain flavor note and/or reduction (suppress) of certain other flavor notes. The blend of GSG and SG provides a certain amount of sweetness, but the present invention shows that such blends modify the flavor and sweetness profile in a wide range of food and beverage applications.

The present invention pertains to a process where the blend of specific type and content of GSG and SG made from Tapioca starch and *stevia* extract, which contains total steviol glycoside content from 50 to 100%, with predominant steviol glycoside molecules of stevioside, Reb A, Reb B, Reb C and Reb D. The specific type of GSG means GSG molecules derived from steviol glycosides with different degree of glycosylation, resulting number of additional glucose units added to base steviol glycoside molecules. The type of residual steviol glycosides means the unreacted residual steviol glycosides, which may be stevioside, Reb A, Reb B, Reb C, Reb D and other steviol glycoside molecules present in the *stevia* extract.

The present invention also pertains to the specific composition of blends, where the type and amount of different GSG molecules and SG molecules contribute different degree of taste modification in the food and beverage applications.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The compositions can be used as flavor and sweetness profile modifier in various food and beverage products. Non-limiting examples of food and beverage products include carbonated soft drinks, ready to drink beverages, energy drinks, isotonic drinks, low-calorie drinks, zero-calorie drinks, sports drinks, teas, fruit and vegetable juices, juice drinks, dairy drinks, yoghurt drinks, alcohol beverages, powdered beverages, bakery products, cookies, biscuits, baking mixes, cereals, confectioneries, candies, toffees, chewing gum, dairy products, flavored milk, yoghurts, flavored yoghurts, cultured milk, soy sauce and other soy base products, salad dressings, mayonnaise, vinegar, frozen-desserts, meat products, fish-meat products, bottled and canned foods, tabletop sweeteners, fruits and vegetables.

Additionally the compositions can be used in drug or pharmaceutical preparations and cosmetics, including but not limited to toothpaste, mouthwash, cough syrup, chewable tablets, lozenges, vitamin preparations, and the like.

The compositions can be used "as-is" or in combination with other sweeteners, sugar alcohols, flavors and food ingredients in food, beverage, pharmaceutical and cosmetics applications.

The following examples illustrate various embodiments of the invention. It will be understood that the invention is not limited to the materials, proportions, conditions and procedures set forth in the examples, which are only illustrative.

Example 1

Figure 1B:
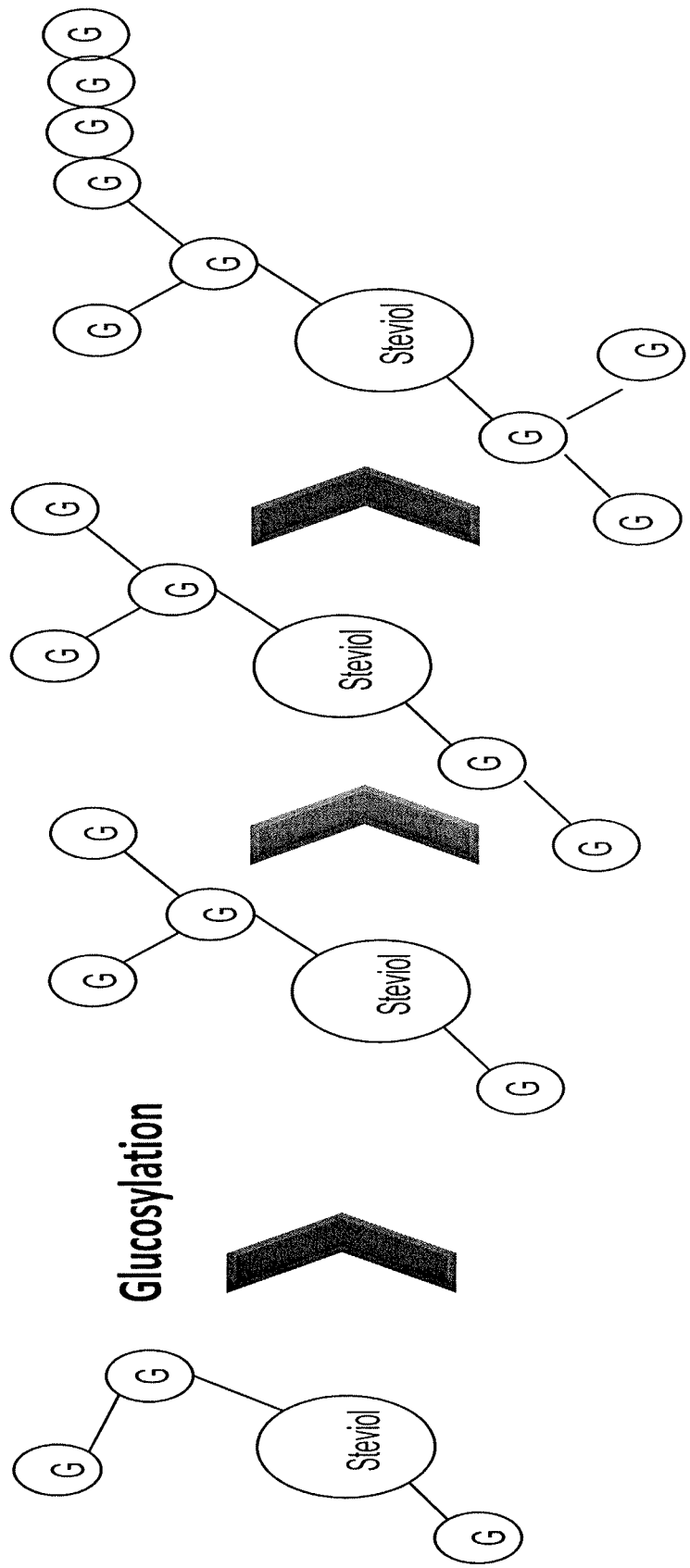

Preparation of the Blend of Steviol Glycosides and Glucosylated Steviol Glycosides Several compositions containing blends of different GSG and SG components were prepared from *stevia* extract and starch. The samples as outlined below were produced by treating the raw materials, steviol glycosides extracted from the *Stevia* plant, and starch extracted from tapioca, with a natural enzyme. The enzyme transfers glucose units from starch to the steviol glycosides. The enzyme used to facilitate this transfer is produced by means of fermentation using non-GMO (non-genetically modified organism) bacteria. Specifically, FIG. 1A illustrates the single glycosylation (G1) of a stevioside molecule. This process can yield multiple glycosylation (G2, G3, etc.) of different steviol glycosides (mainly stevioside and Rebaudioside A) present in *stevia* extract as shown in FIG. 1B.

Manufacturing Steps for Blends of GSG and SG a) Tapioca starch is dissolved in RO water and liquefied by CGTase under controlled processing conditions, b) The *stevia* extract with total steviol glycosides content between 75% and 99% is added to liquefied starch.

c) The starch to *stevia* extract ratio was optimized between 35:65 and 65:35. The ratio was closer to 50/50 ratio for the majority of samples.

d) CGTase (cyclomaltodextrin glucanotransferase) enzyme added to mixture and incubated at 60° C. for a desired length of reaction time to glycosylate steviol glycosides with glucose molecules derived from Tapioca starch.

e) After the desired ratio of GSG and residual steviol glycoside contents achieved, the reaction mixture is heated to 100° C. for 15 min to inactivate the CGTase, which is then removed by treating with activated carbon.

f) The resulting solution of GSG, residual steviol glycosides and maltodextrin is concentrated by means of conventional vacuum evaporator and dried.

TABLE 1

Composition of Glucosyl Steviol Glycosides & Steviol Glycosides in Flavor composition

| | | Composition (dry basis) | |
| --- | --- | --- | --- |
| Blends | Stevia Extract Used | GSG Content | SG Content, Predominant SG |
| GSG-S | TSG > 95%, RA > 50% | >95% | <5%, Reb A |
| GSG-M | TSG > 95%, RA > 50% | >75% | <8%, Reb A |
| GSG-L | TSG > 95%, RA > 50% | >75% | <10%, Reb A |
| GSG-RA | TSG > 95%, RA > 95% | >75% | <8%, Reb A |
| GSG-SW | TSG > 75%, ST > 50% | >75% | <8%, Stevioside |

Example 2

Evaluation of Iso-Sweetness of Different Blends of GSG & SG

To determine the concentration of the blends (Table 1) at which barely any sweetness perception is detected, a series of samples of each blend (Concentration ranging between 40 mg/L and 140 mg/L) were prepared and tested against 1% sugar solution. The test parameters and results are outlined in Tables 2 & 3, respectively.

TABLE 2

Methodology used for determining the iso-sweetness of blends at 1% sugar solution

| | |
|---|---|
| Nature of Participants: | Company employees |
| Number of Sessions | 1 |
| Number of Participants: | 25 |
| Test Design: | 2- AFC, Balanced, randomized within pair. Blind |
| Sensory Test Method: | Intensity ratings |
| Environmental Condition | Standard booth lighting |
| Attributes and Scales: | Which sample is sweeter? |
| Statistical Analysis: | Paired comparison Test |
| Sample Size | ~1.5 oz. in a clear capped plastic cup |
| Serving Temperature | Room temperature (~70° F.) |
| Serving/Panelists Instruction: | Samples served simultaneously. Panelists instructed to read ingredient statement, evaluate each sample. |

TABLE 3

Sweetness equivalence at 1% sugar equivalent sweetness in water

| Blends | Concentration (mg/L) |
|---|---|
| GSG-S | 63 |
| GSG-M | 80 |
| GSG-L | 120 |
| GSG-RA | 82 |
| GSG-SW | 80 |

Example 3

Evaluation and Comparison of Sweetness of the GSG+SG Composition with Selected Commercial Steviol Glycoside Samples To evaluate the iso-sweetness of steviol glycosides (SG) and glucosylated steviol glycosides (GSG), a series of *stevia* derived samples were selected as shown in Table 4. To evaluate the sweetness potency of various concentrations of *stevia* products in aqueous solutions, aqueous solutions of sugar, stevioside, Rebaudioside A (Reb A), Rebaudioside D (Reb D), GSG-S (contains mainly smaller GSGs with 1 or 2 glucose units added to SG), GSG-M and GSG-L at various concentrations were prepared using bottled water. Samples were evaluated by the judges at room temperature (70-72° F.).

TABLE 4

| Test Ingredients | Molecular Wt (avg) | Steviol equivalent | Residual Steviol Glycosides | Glucosylated Steviol Glycosides with added glucose unit | | |
|---|---|---|---|---|---|---|
| | | | | G1 & G2 | G3-G9 | G10-G20 |
| Stevioside | 805 | 0.396 | >99% | | | |
| Reb A | 967 | 0.329 | >99% | | | |
| Reb D | 1129 | 0.282 | >99% | | | |
| GSG-S | 1210 | 0.263 | <10% | 95% | | |
| GSG-M | 1380 | 0.231 | <8% | 42% | 50% | |
| GSG-L | 1798 | 0.177 | <6% | 19% | 60% | 16% |

The judges were 11 panelists that have been previously qualified for their taste acuity and trained in the use of a sweetness intensity rating scale. The evaluations were done in duplicate using the same panelists so that a total of 22 values were generated for each average data point. Prior to the conduct of the study, judges were trained with sugar solutions and the use of the ballot.

Samples were given to the judges sequentially and coded with triple digit numbers. The order of sample presentation was randomized to avoid order of presentation bias. A rest period of five minutes was provided between samples. Water and unsalted crackers were provided in order to cleanse the palate.

Figure 2:
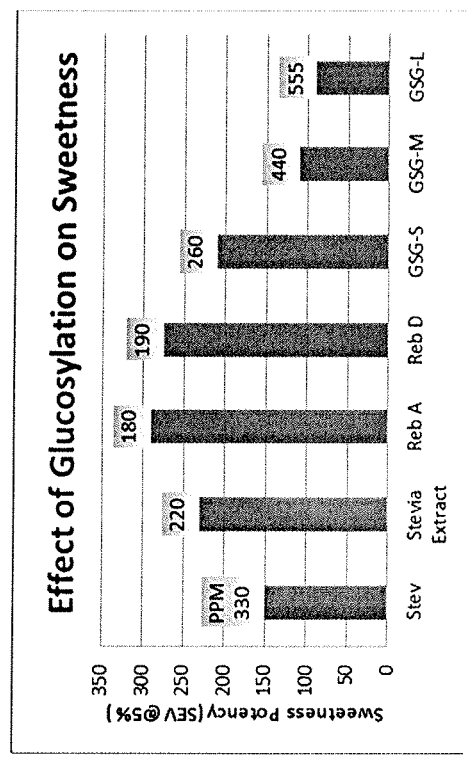
FIG. 2 is a graph of the sweetness potency, or sucrose equivalent value (SEV), of steviol glycosides and Glucosylated steviol glycosides at a 5% sugar sweetness level.

Results were statistically analyzed to generate a standard error value for each solution as well as a confidence level at a 95% level. By comparing the sweetness of each test ingredient to the sweetness of several sucrose solutions, the sweetness potency (at 5% sucrose equivalent) and concentration of each *stevia* ingredient was estimated as shown in FIG. 2. The sweetness equivalence of *stevia* ingredient at 5% sucrose-level is commercially relevant. This figure shows the effect of glycosylation on the SEV of steviol glycosides. The sweetness increases from stevioside to Reb A and then starts decreasing as more glucose units are added to the base molecules (stevioside and Reb A).

Example 4

Effect of Glycosylation on Flavor Modification of No-Sugar-Added Beverage

A mango-passion fruit flavored water formula was developed to evaluate the effect of different *stevia* ingredients on the sweetness and flavor profile of the beverage. A total of 9-10 panel members participated in this sensory test, where they assigned relative values to sweetness, onset of sweetness, mango fruit flavor, passion fruit flavor, acidity, overall taste, etc.

Table 5 shows the no-sugar added beverage formula that used mainly Reb A, Reb D, GSG-S, or GSG-L. The amount of each ingredient (Reb A: 150 ppm; Reb D: 165 ppm; GSG-S: 190 ppm; and GSG-L: 300 ppm) was selected to have around 50 ppm of steviol in each formula.

TABLE 5

Mango-Passion Fruit Flavored Beverage (No Sugar Added)

| Stevia Ingredient | Reb A | Reb D | GSG-S | GSG-L |
|---|---|---|---|---|
| Water | 95.82 | 95.82 | 95.82 | 95.82 |
| SG Content | 0.015 | 0.0165 | 0.019 | 0.03 |
| Citric Acid | 0.078 | 0.078 | 0.078 | 0.078 |
| Sodium Citrate | 0.056 | 0.056 | 0.056 | 0.056 |
| Mango flavor | 0.031 | 0.031 | 0.031 | 0.031 |
| Passion fruit flavor | 0.014 | 0.014 | 0.014 | 0.014 |

Figure 3:
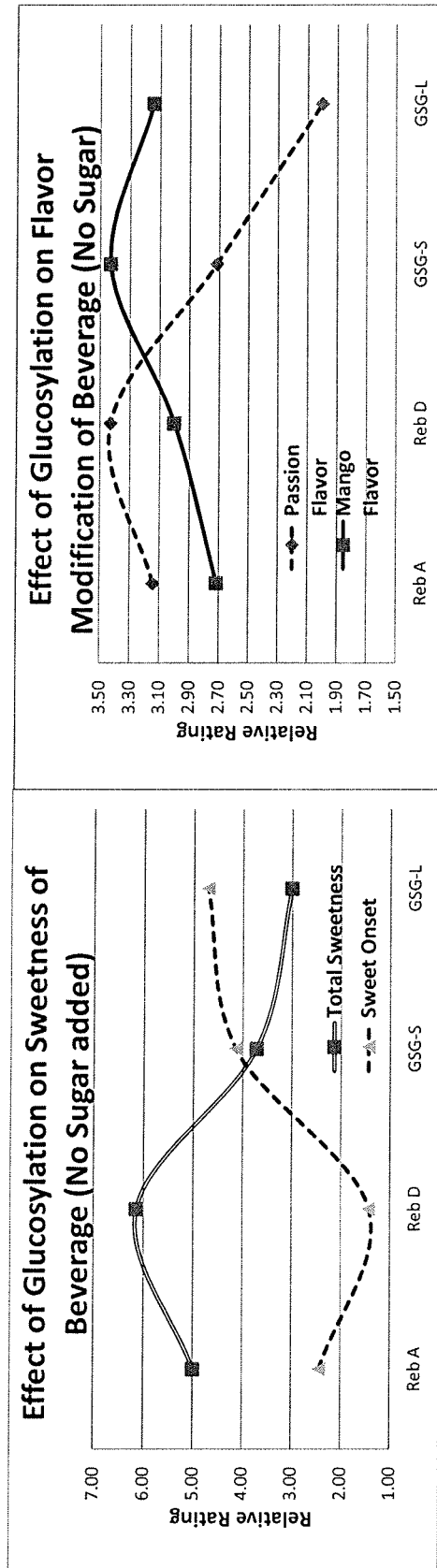
FIG. 3 shows the impact of degree of glucosylation on the perception of sweetness and flavor profile of a typical beverage application.

FIG. 3 shows the modification of flavor and sweetness profiles caused by glycosylation. The sweetness intensity decreased and sweet onset delayed with glycosylation. Mango flavor was enhanced and the passion fruit flavor was suppressed with glycosylation.

Example 5

Effect of the GSG Composition of the Blend on Taste Modification of Calorie Reduced Water Solution To determine the contribution of different flavor blends on a sweetened, acidified water (with citric acid) formulation, samples were made with 9% sugar solution (pH 3.2) and GSG compositions as shown in Table 6 and compared against 10% sugar solution (pH 3.2).

Since sweetness intensity can impact the perception of the overall taste, flavor and sweetness profile, the main objective was to determine the contribution of different flavoring blends on different taste attributes by adding amount of each blend (Table 6) that contributes 1% sugar equivalent sweetness. The taste attributes of sweetness intensity, bitterness intensity and overall liking were used to rank flavors from most to least desirables.

The sensory evaluation was conducted by 20 members consumer panel recruited in Chicago area. Each person was trained on 15 point sweetness and bitterness intensity scale. For each sample, sweetness and bitterness intensity was evaluated on a 15 point scale. Sweet and bitter aftertaste was assessed on a 5 point scale. Overall liking was evaluated on a 9 point hedonic scale. Each participant tasted 5 samples during one session. Unsalted cracker and water were used to cleanse palate in addition to 2 minute wait between samples.

Figure 4:
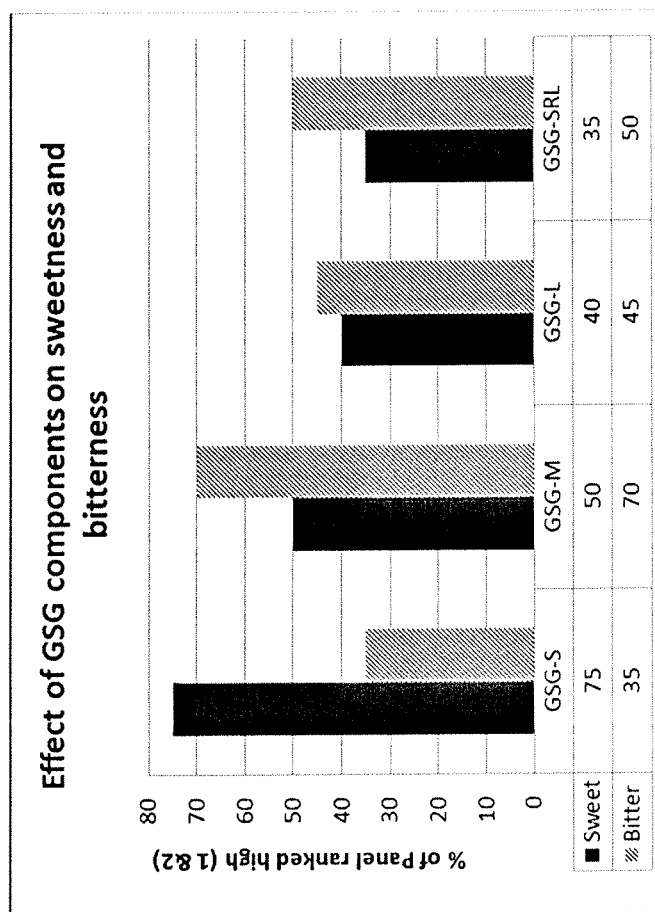
FIG. 4 shows the impact of GSG components on the perception of sweetness and bitterness in beverage application.

In forced ranking, the consumer panels found that GSG-S contributed the highest perception of sweetness, which decreased with larger molecules of GSG (GSG M & GSG-L) as shown in FIG. 4. The perception of bitterness was least for GSG-S, highest for GSG-M. The GSG-L and combination of GSG had lower bitterness than GSG-M. GSG-S was directionally better in delivering sweetness intensity without contributing significant bitterness. The statistical analysis of results indicates that the perception of lower bitterness had the highest impact on the overall liking of a sample. The sweet and bitter aftertaste had lower impact than bitter perception on the overall liking of a sample. FIG. 4 shows the relative perception of sweet and bitter taste.

TABLE 6

Formulations used for evaluating the impact of different GSG blends on taste

| Blends tested | Formulation: 9% acidified sugar solution + flavoring ingredient |
|---|---|
| GSG-S | +63 ppm |
| GSG-M | +80 ppm |
| GSG-L | +120 ppm |
| GSG-RA | +82 ppm |
| Combination GSG-SRL | +21 ppm GSG-S + 27 ppm GSG-RA + 40 ppm GSG-L |

TABLE 7

Ranking of samples according to sweet and bitter taste (highest 1, least 4)

| Flavor Blends | Ranking by percentage (%) of panel members | | | | |
|---|---|---|---|---|---|
| Sweet Ranking | 1 | 2 | 3 | 4 | Ranking High (1 + 2) |
| GSG-S | 50 | 25 | 20 | 5 | 75 |
| GSG-M | 25 | 25 | 25 | 25 | 50 |
| GSG-L | 10 | 30 | 15 | 45 | 40 |
| GSG-SRL | 15 | 20 | 40 | 25 | 35 |
| Bitter Ranking | 1 | 2 | 3 | 4 | Ranking High (1 + 2) |
| GSG-S | 15 | 20 | 15 | 50 | 35 |
| GSG-M | 35 | 35 | 10 | 20 | 70 |
| GSG-L | 20 | 25 | 35 | 20 | 45 |
| GSG-SRL | 30 | 20 | 40 | 10 | 50 |

Example 6

Effect of the GSG and SG Composition of the Blend on Flavor Modification of Calorie Reduced Water Solution To determine the contribution of flavor blends derived from different *stevia* extract and the distribution of residual SG, two GSG samples, GSG-M and GSG-RW were selected. Both these samples have similar GSG content, but they were made from different *stevia* extracts. GSG-M is made from a *stevia* extract with high Reb A content and it contains the predominantly Reb A as the residual SG in the blend. GSG-S is made from a *stevia* extract with high stevioside content and thus it contains the predominantly stevioside as the residual SG in the blend. To investigate the impact of the difference in residual SG content, two sets of acidified sweetened water (with citric acid) formulation, as outlined below, were prepared and tested by 25 consumer panel members.

Each participant was presented Set 1 first, followed by Set 2. The order of samples in each set was randomized and evaluated for sweetness, bitterness intensity and aftertaste and overall liking. Also, each panel member was asked for forced preference for liking in each set.

The Set-1 test samples sweetened with GSG-M and GSG-SW were judged directionally sweeter than 10% sugar solution ($p=0.27$ and $p=0.15$ respectively). The bitterness and aftertaste was similar to the control. No significant differences were seen in overall liking. In forced preference testing, the panel members preferred GSG-SW (48% ranked $1^{st}$) over control (28% ranked $1^{st}$) and GSG-M (24% ranked $1^{st}$).

The set-2 samples sweetened with Reb A and the GSG-M or GSG-SW scored directionally higher on sweetness intensity. The bitterness for GSG-SW was directionally lower than control ($p=0.6$). No significant differences were seen in aftertaste and overall liking.

TABLE 8

Samples tested with two GSG samples to determine the effect of residual steviol glycosides blended with GSG

| Set of Sample | Formulation used for sensory testing |
|---|---|
| Set 1 | Acidified (citric acid) water solution of 10% sugar (Control) |
| | Acidified water solution with 9% sugar and GSG-M of 120 ppm |
| | Acidified water solution with 9% sugar and GSG-SW of 90 ppm |
| Set 2 | Acidified water solution of Reb A @ 500 ppm (Control) |
| | Acidified water Solution of Reb A @ 500 ppm and GSG-M of 120 ppm |
| | Acidified water Solution of Reb A @ 500 ppm and GSG-SW of 90 ppm |

It is to be understood that the foregoing descriptions and specific embodiments shown herein are merely illustrative of the best mode of the invention and the principles thereof, and that modifications and additions may be easily made by those skilled in the art without departing from the spirit and scope of the invention, which is understood to be limited only by the scope of the appended claims.

What is claimed is:
1. A food or beverage product comprising a taste and flavor modifying composition comprising at least 80% total steviol glycosides, the total steviol glycosides comprising a sum of glycosylated and non-glycosylated steviol glycosides wherein:

(a) the glycosylated steviol glycosides comprise short-chain glycosylated steviol glycosides having one to four α-1,4-glucosyl residues;
(b) the non-glycosylated steviol glycosides comprise residual steviol glycoside molecules comprising stevioside, rebaudioside A, and rebaudioside, C, and having β-configured glucosyl residues; and
(c) maltodextrin.

2. The food or beverage product of claim 1, wherein the beverage comprises a carbonated soft drink.

3. The food or beverage product of claim 1, wherein the taste and flavor profile are more intense than a comparative taste and flavor profile of a comparative food or beverage product which does not include the taste and flavor modifying composition.

4. The food or beverage product of claim 1, wherein a mouthfeel of said food or beverage product is improved in relation to a mouthfeel of a comparative food or beverage product which does not include the taste and flavor modifying composition.

* * * * *